June 18, 1963 R. F. ARCHER 3,094,687

COMPOUND CASCADE TRANSISTOR MEMORY CIRCUIT DRIVER

Filed Feb. 8, 1960 2 Sheets-Sheet 1

INVENTOR
ROBERT F. ARCHER
BY Louis R. Kline
J. Hauender
HIS ATTORNEYS

INVENTOR
ROBERT F. ARCHER
BY
HIS ATTORNEYS 3,094,687

COMPOUND CASCADE TRANSISTOR MEMORY CIRCUIT DRIVER

Robert F. Archer, Clayton, Ohio, assignor to The National Cash Register Company, Dayton, Ohio, a corporation of Maryland Filed Feb. 8, 1960, Ser. No. 7,318
5 Claims. (Cl. 340—174)

Figure 1:
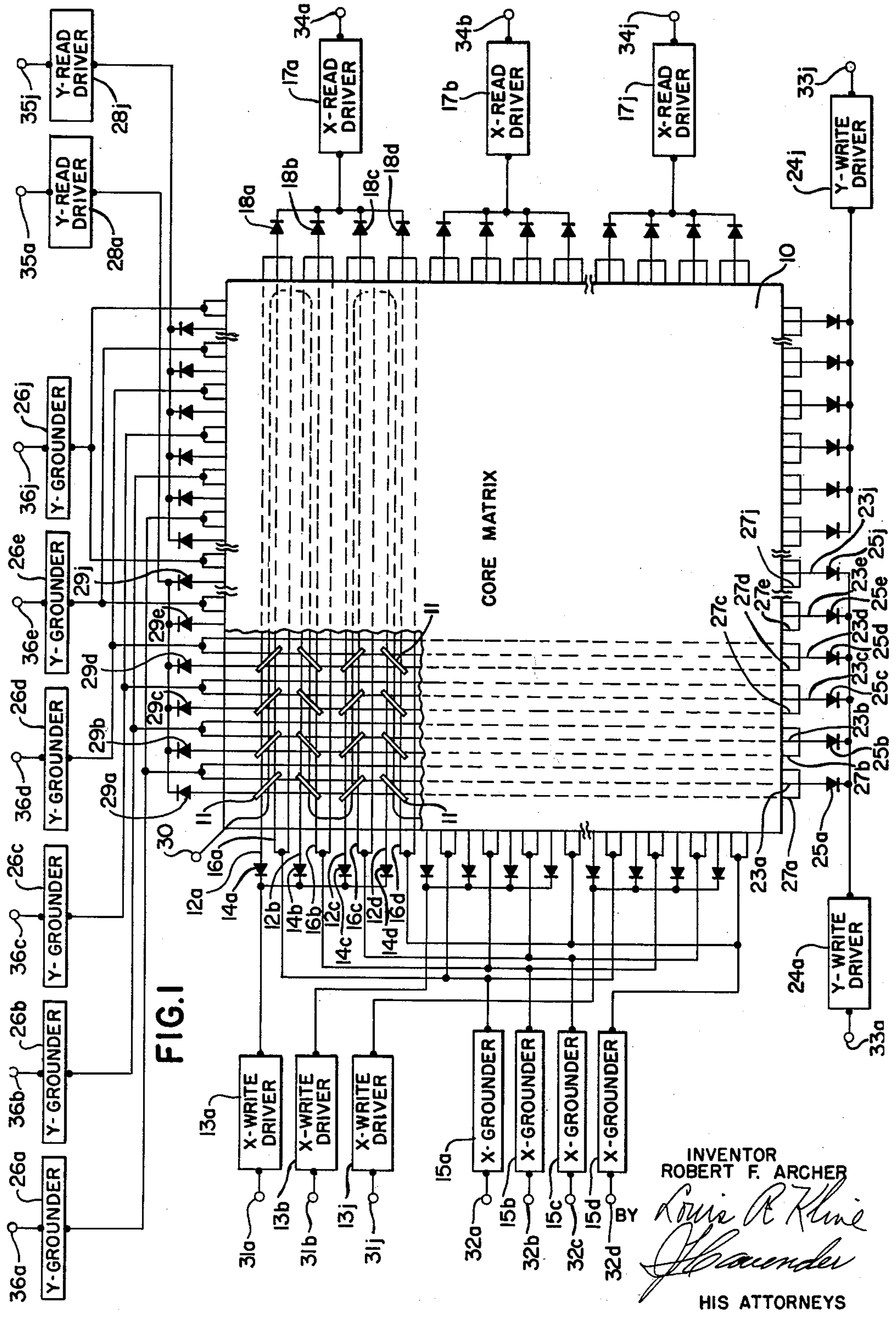

The present invention relates generally to coincident current types of magnetic memory systems and, more particularly, is directed to a novel circuit arrangement for providing driving currents therefor.

Typical coincident current memory systems which utilize, in a well known manner, magnetic elements in the form of toroidal-shaped cores having substantially rectangular-shaped hysteresis loop characteristics have previously been described in articles by J. W. Forrester, entitled "Digital Information Storage in Three Dimensions Using Magnetic Cores," Journal of Applied Physics, volume 22, pages 44 to 48, January 1951; by Jan A. Rajchman entitled "Static Magnetic Matrix Memory and Switching Circuits," RCA Review, volume 13, pages 183 to 201, June 1952; and by Jan A. Rajchman entitled "A Myriabit Magnetic Core Matrix Memory," October 1953 Proceedings of the IRE, pages 1407 to 1421.

With respect to a matrix of magnetic elements which are each selectively employed for storage of binary information, as represented by the relatively stable states of magnetic remanence obtained by individual elements, it is convenient to consider the elements as being arranged in ordered geometric form for operation in accordance with well-known coincident current techniques. For example, the magnetic elements are arranged in a plurality of columns and rows and are individually selected by means of a separate coordinate selection or row coil which is inductively coupled to all of the elements of a different row, and a second coordinate selection or column coil which is inductively coupled to all of the elements of a different column. In such systems, a coincidence of two input signals is generally required to provide a magnetomotive force of sufficient magnitude to overcome the magnetic coercive force of any one element. Thus, by applying a current impulse to one coordinate selection coil and a coincident current impulse to a second coordinate selection coil disposed normal thereto, each impulse providing a magnetomotive force less than the coercive force of the storage element, only that particular storage element linked by both of the coordinate selection coils experiences a change in its state of magnetic remanence to thereby register the binary information represented by the pair of impulses. Such an operation, as described, is generally employed in storing the desired binary bit of information at a particular row and column address.

In order to interrogate a particular storage element to determine the magnetic state thereof, the two coordinate selection coils inductively coupled thereto are again energized in coincidence but in an opposite sense, thus causing the storage element to be returned to its initial state of magnetic remanence. However, due to the collapse of the magnetic flux in one direction and the build-up in the opposite direction, a voltage impulse is induced in the sensing coil inductively coupled to all of the storage elements. Consequently, the interrogation procedure thus provides an output impulse indicative of the particular residual state attained by that particular magnetic element, but at the same time, the information initially stored therein is destroyed. Therefore, if the information is to be repeatedly read out, it is necessary that the information first be restored after each reading operation, and for this purpose each read cycle is commonly followed by a write cycle in order to restore the storage element to its state of magnetic remanence prior to the reading operation. However, if the magnetic condition of the element is in the same direction as that effected by interrogation, substantially no voltage is induced in the sensing coil as a result of the magnetomotive force applied to the element. When the memory organ is to be cleared of information, the write cycle is generally disabled such that all of the storage elements are simultaneously reset to a magnetic datum state, all of which concepts are described fully in each of the above-noted articles.

With the advent of transistor type of semiconductor devices, accompanied by the many well-known advantages to be derived through their use in electronic circuitry, the present-day trend in computer circuitry design is toward the replacement of conventional vacuum tube circuitry with an equivalent transistorized counterpart. However, due to rigid manufacturing tolerances imposed upon the drive-current requirements for proper operation of toroidal-shaped ferrite cores and similar well-known types of magnetic data storage devices such as "twistors" and "bit wires," it has been found that transistorized counterparts of conventional vacuum tube types of memory current drivers are generally not capable of operating within such rigid drive-current tolerances of the magnetic elements utilized in the computer memory as data storage devices.

Therefore, the primary object of the present invention is to devise a novel transistorized current driver which is capable of operating within the rigid drive-current tolerances necessary for proper operation of present-day magnetic data storage devices.

Another object of the present invention is to devise a new and improved transistorized current driver which is readily adaptable to be utilized in conjunction with substantially any of the various static types of computer memories.

Still another object of the present invention is to devise a new and improved transistorized current driver which is of relatively simple circuit configuration and yet is fully capable of maintaining the memory drive-currents within the rigid requirements.

In accordance with the present invention, a new and improved transistorized memory current driver has been devised for use in a memory matrix which utilizes a plurality of magnetic elements arranged in rows and columns, a first plurality of coordinate selection coils each inductively coupled to all of the elements of a different column, a second plurality of coordinate selection coils each inductively coupled to all the elements of a different row, and a sensing coil inductively coupled to all of the storage elements. Such a current driver comprises a first and a second transistor device each having an emitter electrode, a collector electrode, and a base electrode, the emitter electrode of the first transistor device being serially connected with at least one of the coordinate selection coils and the collector electrodes of the two transistors being connected to a common source of unidirectional operating current and to a source of reference potential through a diode device. Means connecting the emitter electrode of the second transistor device with the base electrode of the first transistor device are provided such that the first transistor device is caused to be conductive each time the second transistor device is rendered conductive, each of the transistor devices normally being biased to a non-conducting state, and means connected to the base electrode of the second transistor device are utilized to selectively render the second transistor device conductive.

selectively rendered operative at predetermined programmed times and in a predetermined programmed sequence during execution of a reading and writing cycle of operation with respect to the computer memory.

Due to the fact that the particular manner in which the just-described memory system is connected in the computer circuitry, and thereafter operated, is not considered pertinent to the present invention, a detailed description thereof is not deemed necessary in order to insure a full and complete comprehension of the various novel aspects of the present invention. Briefly, however, if it is assumed that it is desired to store a ten-decimal-digit word in memory address 00, i.e., in the leftmost vertical column of cores, X-write driver 13*a* and X-grounder 15*a* are "selected" via selective energization of input terminals 31*a* and 32*a*, respectively. Consequently, a drive current of half-select magnitude is thereafter caused to flow from X-grounder 15*a*, thence from right to left via conductor 12*a* through the topmost row of cores, and thereafter through isolation diode 14*a* to X-write driver 13*a*. Substantially simultaneously therewith, Y-write driver 24*a* and Y-grounder 26*a* are also "selected" via selective energization of input terminals 33*a* and 36*a*, respectively. As a result, a drive current also of half-select magnitude is thereafter caused to flow from Y-grounder 26*a*, thence downwardly through the leftmost row of cores via conductor 23*a*, and thereafter through isolation diode 25*a* to Y-write driver 24*a*.

Figure 2:
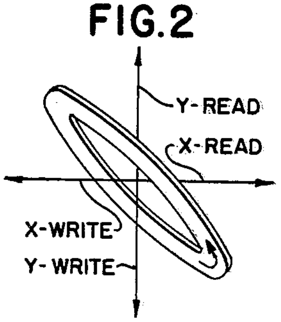

With additional reference to the simplified graphical representation shown in FIG. 2, it can now be seen that, due to the fact that the half-select X-write current flows from right to left through the particular one of cores 11 which is disposed in the extreme upper left-hand corner of the matrix, and, simultaneously therewith, the half-select Y-write current flows downwardly through the same core, the two magnetomotive forces relating to the two half-select write currents are additive in the region of the selected core in such a manner as to produce a resultant magnetomotive force which is of greater comparative magnitude than the coercive force of the core; consequently, that particular core is magnetically saturated in a counter-clockwise direction as illustrated by the direction of the arrow. Due to the fact that each of the remaining cores of the topmost row and leftmost column has been subjected to but a single drive current of half-select magnitude, the magnetic states of all the remaining cores remain unchanged.

After the first or topmost core in address 00 is thus magnetically conditioned representative of, say, a binary 1, X-write driver 13*a* and X-grounder 15*a* are both essentially de-energized and thus rendered ineffective. Thereafter, X-write driver 13*b* and X-grounder 15*b* are simultaneously energized if it is desired to cause the next lower-order core in address 00 to be magnetically conditioned representative of a binary 1; otherwise X-write driver 13*b* and X-grounder 15*b* are not so selected, all in essentially the same manner as just described with respect to the high-order core of address 00. The above-described sequence of events is sequentially repeated until the desired valued word is stored in address 00, thus completing a writing cycle of operation.

If it is now assumed that it is desired to read out the word now stored in address 00, X-grounder 15*a*, X-read driver 17*a*, Y-grounder 26*a*, and Y-read driver 28*a* are all essentially selected at the same time by effecting simultaneous energization of corresponding ones of input terminals 32*a*, 34*a*, 36*a*, and 35*a*. Immediately thereafter, a first half-select drive current is caused to flow upwardly, and a second half-select drive current is coincidentally caused to flow from left to right through the high-order core of address 00, as diagrammatically illustrated in FIG. 2. Consequently, the high-order core of address 00 is caused to be magnetically saturated in the opposite direction as before; i.e., in a clockwise direction. Thus, due to the collapse of the magnetic flux of the selected core in one direction and the build-up in the opposite direction, a voltage impulse is induced in sensing coil 30 indicative of the binary 1 storage in that particular core. Normally, in response to the voltage impulse induced in sensing coil 30, the two half-select read currents are again reversed, so that the selected core is magnetically saturated in the same direction as before the reading operation was initiated, thus preserving the information initially stored in the selected core; otherwise, the information initially stored therein is not preserved.

In view of the foregoing, it is, of course, obvious that the above-described sequence of events is sequentially repeated until the entire word initially stored in address 00 has been read out and re-stored, if desired.

Figure 3:
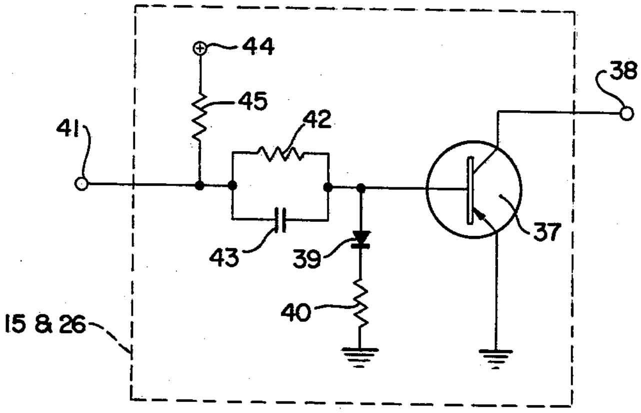

With reference to FIG. 3, there is schematically illustrated therein a circuit diagram of a typical memory grounder such as that utilized in various places throughout the memory system previously shown and described with respect to FIG. 1. More particularly, the grounder comprises a grounded-emitter transistor 37 of the 2N396 variety whose collector electrode is connected to terminal 38. The base electrode of transistor 37 is returned to ground potential by way of a series-connected network comprising a S479G crystal diode 39 and a 100-ohm resistor 40, and is also connected to input terminal 41 through a parallel-connected network comprising a 360-ohm resistor 42 and a 500 $\mu\mu$f. capacitor 43. The junction of input terminal 41, resistor 42, and capacitor 43 is connected through a 1K dropping resistor 45 to bias terminal 44, which has a +12-volt (±7%) bias supply (not shown) connected thereto.

The mode of operation of a grounder of the type illustrated in FIG. 3 is somewhat straightforward. For example, diode 39 is normally conductive due to the positive potential applied to its anode from bias terminal 44. Consequently, a small valued positive potential substantially equal to the voltage drop across resistor 40 is applied to the base electrode of transistor 37 and thereby causes transistor 37 to be normally non-conductive. As a result, the collector current of transistor 37 is substantially zero, and the impedance between the collector thereof and ground is at a maximum value. However, when the potential at input terminal 41 is selectively caused by the computer control circuitry to become negative valued, the potential on the base of transistor 37 likewise becomes negative valued, and, as a result, transistor 37 is immediately rendered conductive and remains conductive as long as the potential applied to input terminal 41 remains at some negative value. When transistor 37 is thus rendered conductive, the impedance between output terminal 38 and ground is essentially zero. It is therefore evident that terminal 38 is effectively open-circuited whenever the potential at input terminal 41 is essentially of some polarity other than negative; conversely, terminal 38 is effectively short-circuited to ground whenever the potential at input terminal 41 is negative by a magnitude substantially greater than the absolute value of the positive potential applied to the base of transistor 37 from bias terminal 44.

Figure 4:
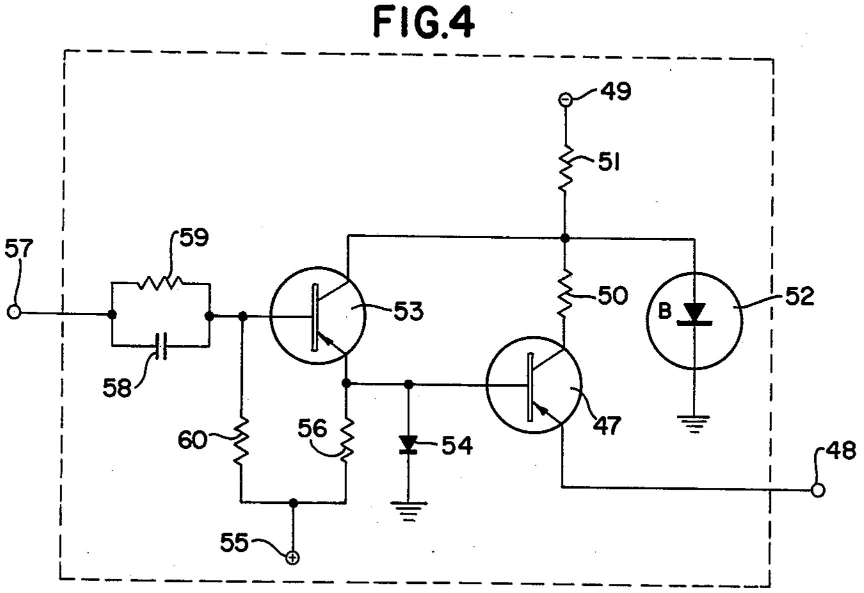
Figure 1:
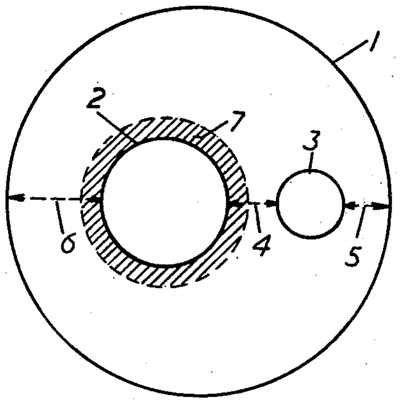
Figure 2:
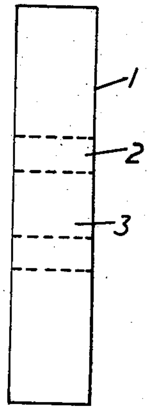
Figure 3:
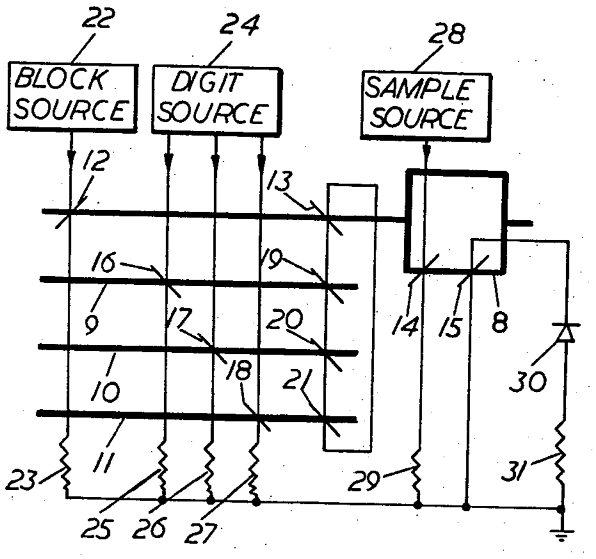

With reference now to FIG. 4, there is illustrated therein a novel memory current driver constructed in accordance with a preferred embodiment of the present invention. The current driver consists essentially of a 2N396 transistor 47, whose emitter electrode is directly connected to terminal 48 and whose collector electrode is connected to a −40-volt (±4%) bias supply terminal 49 through a series-connected resistor arrangement comprising a 4-ohm (±1%) wire-wound resistor 50 and a 186-ohm (±2%) resistor 51, the junction of resistors 50 and 51 being returned to ground through a 4.7-volt type 1N1519 Zener diode 52. The driver further includes a second transistor 53 of the 2N404 variety whose collector electrode is directly connected to the junction of resistors 50 and 51 and whose emitter electrode is directly connected to the base electrode of transistor 47. The emitter electrode of transistor 53 is also returned to ground through a S479G crystal diode 54 and is additionally connectd to a +12-volt (±7%) bias terminal 55 through a 2K (±5%) resistor 56. The base electrode of transistor 53 is connected to input terminal 57 through a parallel-connected network comprising a 500 μμf. (±10%) capacitor 58 and a 2K (±5%) resistor 59 and is additionally connected to bias terminal 55 through a 15K (±5%) resistor 60.

Before describing the mode of operation of the novel memory current driver shown in FIG. 4, it is to be pointed out that a different one of the memory drive or coordinate selection lines threaded through either a row or a column of cores is connected between terminal 48 of a corresponding current driver and terminal 38 of a corresponding current grounder in essentially the same manner as illustrated in FIG. 1. Further, for illustrative purposes only and not by way of a limitation, it is assumed that the magnetic data storage elements utilized in the examplary memory system are toroidal-shaped ferrite cores of the type at present manufactured by the present assignee as N–400, each of which at a temperature of 78 degrees Fahrenheit requires a half-select drive current of 200 ma. (±7.5%) through a single-turn conductor threaded through the aperture thereof. It is further assumed that, effectively, either an "Off" triggering potential of from 0 to −0.3 volts or an "On" triggering potential of from −7.65 to −8.95 volts is logically applied at all times to input terminal 57 of the current driver by means of the computer control circuitry.

If it is first assumed that an Off triggering potential is applied to input terminal 57, a small positive potential substantially equal in magnitude to the potential drop across resistor 59 is applied from bias terminal 55 to the base of transistor 53, thus causing transistor 53 to thereafter be in a non-conducting state. As transistor 53 is now considered to be in a non-conducting state such that the emitter current thereof is substantially zero, and as crystal diode 54 is in a conducting state as a result of the positive potential applied to the anode thereof from bias terminal 55, a small positive potential equal in magnitude to the potential drop across diode 54 is applied from bias terminal 55 to the base of transistor 47, thus also rendering transistor 47 non-conductive, so that the emitter current thereof likewise is substantially zero. As long as transistor 47 remains non-conductive, Zener diode 52 maintains a regulated potential substantially equal to −4.5 volts on the collector electrode of transistor 47; otherwise, diode 52 functions essentially as an open circuit. As is well known in the art, a suitable triggering potential is also applied during this time to input terminal 41 of the current grounder (FIG. 3) such that transistor 37 thereof is rendered non-conductive thereby in the same manner as previously described. Therefore, as the driver and the grounder are both essentially turned "Off" at this particular moment, substantially no current is allowed to flow through the particular coordinate selection coil connected between terminals 38 and 48.

It is next assumed that a negative triggering potential is applied to input terminal 41 of the current grounder and is of a magnitude sufficient to forward bias the emitter-base junction of transistor 37 to the extent that the impedance between collector and emitter thereof is reduced substantially to zero, and, substantially coincidentally therewith, an "On" triggering potential is applied to input terminal 57 of the current driver. As a result of the "On" triggering potential applied to terminal 57, the emitter-base junction of transistor 53 is forward biased, so that a nominal current of approximately 3.5 ma. is caused to flow outwardly from the base of transistor 53 toward terminal 57 and is, accordingly, of sufficient magnitude to effect saturation of transistor 53, so that the impedance between collector to emitter thereof is reduced to substantially zero. Upon saturation of transistor 53, the collector current therefrom is stabilized at a maximum value determined by the values of resistors 51 and 56 plus the collector-to-emitter resistance of transistor 53 and the magnitudes of the bias potentials applied to terminals 49 and 55. In addition, the potential between emitter and ground of transistor 53 becomes sufficiently negative to render diode 54 non-conductive and to forward bias the emitter-base junction of transistor 47. Consequently, base current is caused to flow outwardly from transistor 47 of sufficient magnitude to cause saturation thereof. Upon saturation of transistor 47, the collector current is stabilized at a maximum value determined by the values of resistors 50 and 51, the magnitude of the bias potential applied to terminal 49, and the collector-to-emitter resistances of transistors 37 and 47.

As both the current driver and grounder are thus rendered operative in the manner just described, a 200 ma. (±7.5%) half-select drive current is thereafter caused to flow through the particular coordinate selection line which is connected between terminals 38 and 48; the magnitude of which current, of course, is equal to the magnitude of the emitter current of transistor 47. However, when the current driver and grounder are both rendered inoperative in the manner previously described, the half-select drive current is immediately reduced to zero.

In order that the uniqueness of the just-described current driver may be more fully understood and appreciated, the following description will be directed toward demonstrating the capability of the current driver of maintaining the half-select drive current within the required ±7.5% tolerance, which, from a practical standpoint, has not heretofore been possible with the use of prior current drivers.

First of all, a ±4% potential variation at bias terminal 49, due to a change in ambient temperature, component aging, etc., of the power supply connected thereto, reflects a maximum emitter current variation of transistor 47 of a corresponding ±4%; also, a ±2% variation from the nominal value of resistor 51 reflects a maximum emitter current variation of a corresponding ±2%. Due to the fact that the value of resistor 50 is of several orders of magnitude smaller than the value of resistor 51, the reflected emitter current variation of transistor 47 caused by a maximum deviation of ±1% from the nominal value of resistor 50 is ignored.

It is determined from the manufacturing specifications respecting a type 2N396 transistor that the collector-to-emitter potential variation from transistor to transistor, determined during conduction of the transistor, is from .15 to .30 volt and that the potential variation across a conducting DR453 type crystal diode is from .4 to .8 volt from diode to diode of the same type.

It is therefore evident that, during conduction, the summation of the maximum potential variations across the collector-emitter electrodes of transistors 37 and 47 and the maximum potential variation across the particular isolation diode serially connected between terminals 38 and 48 is .70 volt; i.e., ±.875% of the nominal value of the voltage at bias terminal 49. Consequently, the maximum reflected emitter current variation from nominal of transistor 47 due to the combined variations from nominal of the values or characteristics of the bias potential at terminal 49, resistors 50 and 51, transistors 37 and 47, and the particular isolation diode connected between terminals 38 and 48 is ±6.875%, which, when subtracted from the ±7.5% half-select drive current tolerance, is equal to ±.625%.

It is to be appreciated at this point that, due to the fact that the base of transistor 47 is directly connected to the emitter of transistor 53, plus the fact that the collecor of transistor 53 is returned to the same bias terminal (49) through the same dropping resistor (51) as the collector of transistor 47, the necessity of maintaining the base current of transistor 47 within a tolerance of ±.625% is thereby eliminated. This is because substantially all of the base current from transistor 47 is returned to bias terminal 49 via transistor 53 and resistor 51, and, as a result, the summation of the collector and base currents of transistor 47 remains substantially constant.

As previously mentioned, it is assumed that the "On" triggering potential applied to input terminal 57 varies from −7.65 volts to −8.95 volts due to the tolerances of the logical circuitry connected thereto, which triggering potential variation effects a 2.52 ma. to 4.15 ma. input current variation at terminal 57. As a result of the 1.63 ma. input current variation at terminal 57, there is reflected a ±0.4% variation in the emitter current of transistor 47.

Finally, a potential variation of ±7% at bias terminal 55 causes a change in the current through resistors 56 and 60, which, over the extreme variation of ±5% with respect to the value of each of resistors 56 and 60, reflects a ±0.225% variation in the magnitude of the emitter current of transistor 47.

Thus, as the summation of all of the various reflected emitter current variations of transistor 47 is equal to ±7.5%, it is apparent that the novel current driver, constructed in accordance with the present invention, is fully capable of maintaining the half-select drive current within the required tolerance of ±7.5%. Additionally, such a new and improved current driver is characterized by extreme simplicity of construction and operation and is readily adaptable to be incorporated in substantially any of the various static types of computer memories.

While a particular embodiment of the present invention has been shown and described in detail, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. In a magnetic matrix system including a plurality of magnetic elements arranged in rows and columns, the combination comprising: a first plurality of coordinate selection coils each inductively coupled to all of the elements of a different column; a second plurality of coordinate selection coils each inductively coupled to all of the elements of a different row; sensing means inductively coupled to all of said elements; a first and a second transistor device each having an emitter electrode, a collector electrode, and a base electrode; means serially connecting the emitter electrode of said first transistor device with at least one of said coordinate selection coils; means connecting the collector electrode of each of said transistor devices to a common source of unidirectional operating current and to a source of reference potential through a diode device; means connecting the emitter electrode of said second transistor device with the base electrode of said first transistor device such that said first transistor device is caused to be conductive each time said second transistor device is rendered conductive; means to bias each of said transistor devices to a nonconducting state; and means connected to the base electrode of said second transistor device to selectively render said second transistor device conductive.

2. The combination defined in claim 1 wherein said transistor devices are of like conductivity type.

3. The combination defined in claim 1 wherein said transistor devices are junction transistors of the PNP variety.

4. The combination defined in claim 1 wherein the emitter electrode of said second transistor device and the base electrode of said first transistor device are each returned to a source of reference potential through a diode device.

5. The combination defined in claim 1 wherein said diode device is a semiconductor of the Zener type.

References Cited in the file of this patent

UNITED STATES PATENTS

| | | |
|---|---|---|
| 2,901,735 | Lawrence | Aug. 25, 1959 |
| 2,914,748 | Anderson | Nov. 24, 1959 |
| 2,929,050 | Russell | Mar. 15, 1960 |
| 2,947,977 | Bloch | Aug. 2, 1960 |
| 2,949,543 | Nordahl et al. | Aug. 16, 1960 |

FOREIGN PATENTS

| | | |
|---|---|---|
| 1,186,856 | France | Mar. 2, 1959 |

June 18, 1963 D. R. BARBER 3,094,688

DECODING EQUIPMENT

Filed Feb. 11, 1960

Inventor
D. R. BARBER
By C. H. Suydam
AGENT